US009031531B2

United States Patent
Miluzzo et al.

(10) Patent No.: US 9,031,531 B2
(45) Date of Patent: May 12, 2015

(54) DISTRIBUTED COMPUTING TASK COSTING WITH A MOBILE DEVICE

(71) Applicant: AT&T Intellectual Property I, L.P., Atlanta, GA (US)

(72) Inventors: Emiliano Miluzzo, Madison, NJ (US); Ramon Caceres, New York, NY (US); Yih-Farn Robin Chen, Bridgewater, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 226 days.

(21) Appl. No.: 13/682,560

(22) Filed: Nov. 20, 2012

(65) Prior Publication Data

US 2014/0141744 A1    May 22, 2014

(51) Int. Cl.
| | |
|---|---|
| *H04M 11/00* | (2006.01) |
| *H04W 4/24* | (2009.01) |
| *H04L 29/08* | (2006.01) |
| *H04L 12/24* | (2006.01) |
| *G06F 9/50* | (2006.01) |
| *H04M 15/00* | (2006.01) |

(52) U.S. Cl.
CPC .............. *H04W 4/24* (2013.01); *H04L 67/104* (2013.01); *H04L 41/0826* (2013.01); *G06F 9/5072* (2013.01); *H04L 67/10* (2013.01); *H04M 15/8044* (2013.01); *H04M 15/8214* (2013.01); *G06F 2209/5017* (2013.01)

(58) Field of Classification Search
CPC .............. H04L 67/104; H04L 67/1046; H04L 67/1053
See application file for complete search history.

(56) References Cited

U.S. PATENT DOCUMENTS

| | | | |
|---|---|---|---|
| 5,056,019 A | 10/1991 | Schultz et al. | |
| 5,978,594 A | 11/1999 | Bonnell et al. | |
| 6,009,455 A | 12/1999 | Doyle | |
| 6,078,906 A | 6/2000 | Huberman | |
| 7,003,547 B1 | 2/2006 | Hubbard | |
| 8,341,293 B2 * | 12/2012 | Ahn et al. | ...................... 709/243 |

(Continued)

OTHER PUBLICATIONS

"AT&T 2011 Annual Report." http://www.att.com/Common/about_us/files/pdf/ar2011_annual_report.pdf. (2011), Last accessed Oct. 10, 2012, 100 pages.

(Continued)

*Primary Examiner* — Quan M Hua
(74) *Attorney, Agent, or Firm* — Amin, Turocy & Watson, LLP

(57) ABSTRACT

Distributed computing task costing is disclosed. Costing can be employed to determine if a task will be passed to a distributed computing cluster including mobile devices. Costing can include determining a base cost value predicated on a selectable level of utility to a user of a burdened device, a base time value related to completing the task without the use of the cluster, determining a delay cost, and any monetary costs associated with performing the task without the use of the cluster. Costing can further include demining a relief cost that can include the selectable level of utility, a relief time value related to completing the task with the cluster, the delay cost, an incentive cost based on the sum across a set of relief devices and their corresponding parameters for cluster participation, and any remaining monetary costs borne by the burdened device. Where the base cost value and relief cost value satisfies conditions, a task can be divided into subtasks that can be distributed to the cluster to accomplish the task in a distributed computing environment.

20 Claims, 10 Drawing Sheets

(56) References Cited

U.S. PATENT DOCUMENTS 8,792,371 B2 * 7/2014 Woo .............................. 370/252
2009/0210545 A1 * 8/2009 Wright .......................... 709/230

OTHER PUBLICATIONS

"AT&T Watson (SM) Speech Technologies", http://tinyurl.com/7qvd4l4, last accessed Oct. 10, 2012, 2 pages.
Cho et al., "Personal Networks." UCLA Network Research Lab (2011); http://nrlweb.cs.ucla.edu/project/show/3, last accessed Oct. 10, 2012, 1 page.
Higgenbotham, "Qualcomm's Flashlinq, Wi-Fi Direct and the New Connectivity", Feb. 8, 2011, http://tinyurl.com/c3ba46s, last accessed Oct. 10, 2012, 8 pages.
"Trends in Smartphone Data Use." http://www.arieso.com/news-article.html?id=89., last accessed Oct. 11, 2012, 2 pages.
Basagni, et al. "Mobile ad hoc Networking". Wiley-IEEE Press, 2004.
Conti, et al., "Opportunities in Opportunistic Computing." Computer 43.1 (2010): pp. 42-50.
Cuervo, et al., "Maui: Making Smartphones Last Longer with Code Offload." Proceedings of the 8th international conference on Mobile systems, applications, and services. ACM, 2010.
Huggins-Daines, et al., "PocketSphinx: A Free, Real-Time Continuous Speech Recognition System for Hand-Held Devices." Acoustics, Speech and Signal Processing, 2006. ICASSP 2006 Proceedings. 2006 IEEE International Conference on. vol. 1. IEEE, 2006.
Joe-Wong, et al., Time-Dependent Broadband Pricing: Feasibility and Benefits. Distributed Computing Systems (ICDCS), 2011 31st International Conference on. IEEE, 2011.
Koukoumidis, et al., "Pocket cloudlets." ACM SIGARCH Computer Architecture News 39.1 (2011): 171-184.
Lane, et al. "A Survey of Mobile Phone Sensing." Communications Magazine, IEEE, 48(9):140{150, 2010.
Mendelson, "Pricing Computer Services: Queuing Effects." Communications of the ACM, 1985.
Miluzzo, et al., "Darwin Phones: the Evolution of Sensing and Inference on Mobile Phones." Proceedings of the 8th international conference on Mobile systems, applications, and services. ACM, 2010.
Satyanarayanan, et al., "The Case for VM-Based Cloudlets in Mobile Computing." Pervasive Computing, IEEE, 8(4):14{23, 2009.
Uninor "Dynamic Pricing Plan with per Second Billing." Feb. 2010. http://bit.ly/oBl9kW, 2 pages.
Li et al., "Computation offloading to save energy on handheld devices: a partition scheme." Proceedings of the 2001 international conference on Compilers, architecture, and synthesis for embedded systems. ACM, 2001.
Fernando et al., "Mobile cloud computing: A survey." Future Generation Computer Systems (2012).
Lilien et al., "Opportunistic Networks: Challenges in Specializing the P2P Paradigm", PDMST'06, Krakow, Poland Database and Expert Systems Applications, 2006. DEXA'06. 17th International Workshop on. IEEE, 2006.
Brent Jason Lagesse, "UBCA: AUtility Based Clustering Architecture for Peer to Peer Networks", Distributed Computing Systems Workshops, 2007. ICDCSW'07. 27th International Conference on. IEEE, 2007.
Dinh et al., "A Survey of Mobile Cloud Computing: Architecture, Applications, and Approaches", Wireless Communications and Mobile Computing (2011).

* cited by examiner

DISTRIBUTED COMPUTING TASK COSTING WITH A MOBILE DEVICE

TECHNICAL FIELD

The disclosed subject matter relates to distributed computing with a mobile device and, more particularly, to costing of a task for distributed computing with a mobile device.

BACKGROUND

By way of brief background, mobile devices are becoming ever more powerful. As such, there can be conditions where mobile devices in proximity to each other can share computing and connectivity resources synergistically. Distributed computing with mobile devices can facilitate the use of underutilized devices to perform tasks that benefit other mobile devices. Conventionally, mobile devices can act as thin clients for computation that takes place on powerful back-end computing systems. When mobile devices are used in this manner, the transfer of information between back ends and mobile devices can have a substantial portion of bandwidth consumed in overhead information rather than efficiently using the limited bandwidth for consumable information.

DETAILED DESCRIPTION

Figure 1:
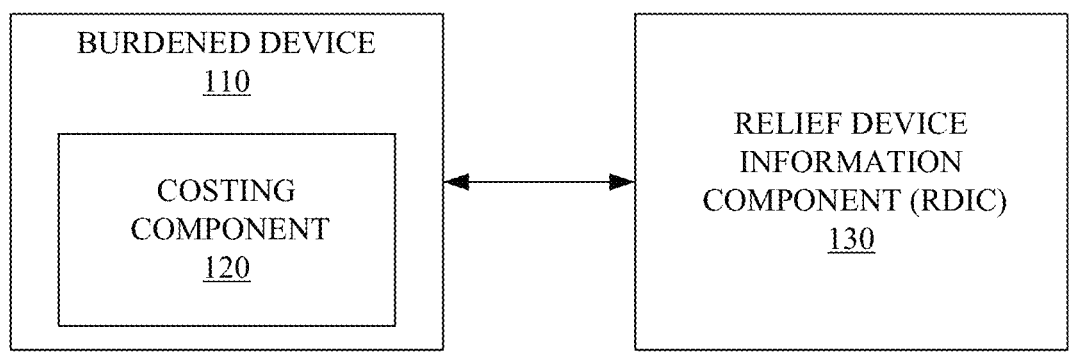
FIG. 1 is an illustration of a system that facilitates task costing in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

Distributed computing for mobile devices can treat mobile devices as thin clients for back-end distributed computing resources. Task costing at mobile devices can facilitate an efficient use of available bandwidth where mobile devices can be pooled into a cluster to perform distributed computing. Most modern mobile devices have both cellular radios, e.g., for interaction with wireless network provider equipment, and local wireless radios, e.g., Wi-Fi (IEEE 802.11xx type radios), Bluetooth (versions 1, 2, 3, 4, etc.), Zigbee (based on IEEE 802.15.4), etc. Therefore, mobile devices can be communicatively coupled by way of both local radio interfaces and/or by way of cellular radio resources. As an example, two nearby mobile devices can send data from one to another by first sending it up to a wireless carrier and then back down to the other mobile device by way of cellular radios, or the two devices can share data locally with each other, such as by Bluetooth or through Wi-Fi radios.

Studies on smartphone data usage show that the launch of the latest mobile device generations has triggered an exponential growth of wireless bandwidth demand. As an example, just 1% of all users now consume half of the entire downlink data and wireless data traffic handled by AT&T's network went from 0.1 Petabytes in 2006 to 27.1 Petabytes in 2011, a 27,000% increase in 5 years. A major reason for this increase is that many applications and services involving some computation heavily rely on the cloud to complete their tasks. The mobile device is often employed to send information to the cloud for processing, and receive the output of this processing back. This approach has serious drawbacks in that it might incur in network scalability issues given the limitations of finite radio spectrum.

Processing currently done on back-end systems can be transferred to mobile devices increasingly, so as mobile device hardware can become increasingly capable of handling heavy computational loads. Mobile devices may at some point be as powerful as today's back-end machines, and task processing can then require only little or even no support from the back end.

Furthermore, 3G cellular data interfaces can require 3 to 5 times more energy than Wi-Fi transmissions. Sending data remotely then not only claims large shares of wireless bandwidth, but also takes its toll in terms of mobile device energy cost. By promoting local processing, distributed computing among mobile devices can syphon data off the cellular data channels and reduce the back-end cloud complexity by pushing processing and decision making to the edge-devices, e.g., onto the mobile devices. This can be particularly true where local data exchanges between mobile device cluster members can occur over high-bandwidth Wi-Fi type networks, both ad-hoc and multicast, or through emerging short-range radio technologies specifically designed for direct interaction between mobile devices. Should any remote data be required to support a local processing task, the data could be transferred to a mobile device opportunistically, such as by way of Wi-Fi, during off peak hours by way of the cellular network, etc.

In situations where the cost of processing a task on a device results in the device's being burdened, some task processing can be shifted to other devices in a distributed computing cluster, e.g., a relief device(s). As an example, image and video processing operations can exploit high levels of parallelism. Each relief device can independently process an assigned subtask and return the result back to the burdened device. After collecting the results from the relief devices, the burdened device can combine these results to produce the final processing output. As a second example, given the growing interest in mobile sensing applications profiling people's context and behavior, machine-learning algorithms can require heavy computation for which the support of powerful, back-end machines is conventionally needed. These tasks can be accomplished within a distributed computing cluster having a plurality of nearby mobile devices with less need to send large quantities of data to back-end cloud systems. Further, it is expected that mobile burdened devices can generally also rely on the back-end cloud for completing operations whenever it is not possible to successfully instantiate a distributed processing task in collaboration with nearby relief devices. This can occur because of the heterogeneous cluster environment, such as where relief devices can have different capabilities that cannot fulfill the requests of the burdened device. As another example, a cluster can also be a highly dynamic group of participating mobile devices, in which member devices join and leave with little guarantees about the persistence of some of the computational resources. As a further example, nearby relief devices can be unwilling to accept a task based on local criteria such as owner preference, remaining battery life, impact on current processes, etc.

Selection or designation of task process distribution can be premised on costing information. Costing information can be determined based on the parameters of the processing task itself, the specifications and conditions of the burdened device, the specifications and conditions of a relief device, the nature of the cluster environment, and other salient metrics. Further, proper incentive policies can allow users with mobile devices to opt-in for cluster participation. It will be noted that the disclosed subject matter facilitates distribution of computing tasks based on utility, monetary costs, or combinations of utility and monetary costs. Further, the disclosed subject matter allows a user to designate a valuation for accomplishing a task. As an example, a user can designate a utility-to-monetary-cost conversion factor that can be employed to convert determined utility into monetary costs. As another example, a user can indicate that a task should be processed in a cluster even where it is less resource efficient because the user values results being returned more quickly. As a third example, a user can even elect to pay a higher monetary cost to process a task in a peer-to-peer network, such as to get results faster, which can be contrast with conventional techniques that seek to simply minimize costs.

The following presents simplified example embodiments of the disclosed subject matter in order to provide a basic understanding of some aspects of the various embodiments. This is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an embodiment, a system can include a processor and memory. The processor can facilitate the execution of computer-executable instructions stored on the memory. The execution of the computer-executable instructions can cause the processor to receive information related to a relief device that can facilitate accomplishment of a subtask of a task, the task being accomplished by way of a distributed computing environment. Further, the processor can determine a base cost value for accomplishing the task without assistance from the relief device. The processor can also determine a cost value for accomplishing the task with assistance of the relief device, based on the first information and then facilitate access to the base cost value information and the first cost value information.

In another embodiment, a method can include receiving, by a system including a processor, first information related to a subset of relief devices, including at least a first relief device of a set of relief devices. The set of relief devices can facilitate accomplishment of a subtask of a task that can be accomplished by way of a distributed computing environment. The method can further include determining a base cost value associated with accomplishing the task without assistance from the set of relief devices and determining a first cost value associated with accomplishing the task with assistance of the subset of relief device based on the first information. The method can then facilitate access to the base cost value information and the first cost value information.

In a further embodiment, a device can include a memory storing computer-executable instructions and a processor that facilitates execution of the computer-executable instructions. These instructions can cause the processor to receive relief device information that can facilitate accomplishing a subtask of a task, wherein the task is accomplished by way of a distributed computing environment. The processor can further determine a base cost value associated with accomplishing the task without assistance from the relief device and determine a relief cost value associated with accomplishing the task with assistance of the relief device based on the relief device information. The processor can then facilitate access to the base cost value information and the relief cost value information.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages and novel features of the disclosed subject matter will become apparent from the following detailed description when considered in conjunction with the provided drawings.

FIG. 1 is an illustration of a system 100, which facilitates task costing in accordance with aspects of the subject disclosure. System 100 can include burdened device 110 that can include costing component 120. Burdened device 110 can be a mobile device with a pending task. Costing component 120 can determine the cost of performing the task on burdened device 110 without employing distributed computing techniques, e.g., simply performing the task as if the burdened device were not part of a distributed computing cluster. Where this cost analysis indicates that performing the task on the burdened device itself does not satisfy conditions that would initiate a distributed computing request, the task can simply be processed by burdened device 110 itself. As an example, where the task is processing a 10-second video clip, and the cost analysis indicates that there would be a minimal decrease in device performance, the task can be processed on the device without instigating a request for relief from other devices in the cluster. However, where the determined cost does satisfy conditions that would initiate a distributed computing request, the process of distributing the task to devices comprising the cluster can be instigated. As an example, where the task is facial recognition of numerous faces in a digital image, and it is determined that the task would sufficiently impact the performance of the burdened device, processing assistance can be requested from other devices in the cluster.

Burdened device 110 can be communicatively coupled with relief device information component (RDIC) 130. RDIC 130 can provide for access to information related to other devices in a cluster to facilitate determining a cost option(s) for distributed processing of the task. As an example, where the task is facial recognition of 20 faces in a digital image, RDIC 130 can provide access to information about other devices in the cluster. Where the cluster includes three other mobile devices, e.g., three relief devices, a cost option can be to process five faces on each device, e.g., five on the burdened device, and five each on the three other mobile devices of the cluster. This can result in each device using its own resources to process their assigned five faces and then returning the facial recognition information back to the burdened device that can unify the distributed processing results from the cluster members. Another cost option can be to process two faces on the relief devices for no fee, and to charge a fee for each additional face processed on a relief device. As such, the burdened device can determine what combination of local processing and distributed processing the cluster is the lowest cost, the fastest, the most efficient use of available resources, etc. Based on these determinations, a cost option can be selected such that the task can be distributed among the participating devices accordingly. This selection can be automatic, such as selecting the fastest process despite costs, selecting the lowest cost to complete the task within a given time frame, etc., or can be based on receiving a selection from a user, e.g., presenting the cost options to the burdened device user for selection of the appropriate cost option.

The information received by way of RDIC 130 can include information about other cluster devices hardware and software, e.g., processor speed, battery/charging information, available memory, radio technology (e.g., 2G, 3G, 4G, IEEE 802.11a/b/g/n, Bluetooth, Zigbee, etc.), operating system and version, background processes, etc. Further, RDIC 130 can include information about other cluster device user preferences, such as, willingness to participate in a cluster, usage history, performance history, etc. Additionally, RDIC 130 can include information about other cluster device user environments, such as service agreement information pertaining to cost for data access on cellular resources (e.g., 2 GB/month included plus $25/GB thereafter), Wi-Fi access agreements for the user device, etc. As an example, RDIC 130 can indicate that a first relief device of a cluster (hereinafter "RD1") can be a 4G enabled smartphone with a faster processor and more free memory than a burdened device, that RD1 has an unlimited cellular data package included as part of the associated wireless service agreement, includes an 802.11n radio, and is currently idle while sitting fully charged on a charging station, with user designated fees of $0.01/minute of relief task processing. As a second example, RDIC 130 can indicate that a second relief device of a cluster (hereinafter "RD2") can be a 3G enabled smartphone with a faster processor and less free memory than a burdened device, that RD2 has an $25/2 GB cellular data package included as part of the associated wireless service agreement, includes an 802.11g radio and Bluetooth, and is currently idle while with 30% of total battery life remaining, and user designated cluster participation cutoffs of 20% battery, 50% of free memory usage, and/or 30% of processor cycles.

Where burdened device 110 determines, by way of costing component 120, that distributed process can be requested, costing component 120 can receive relief device information by way of RDIC 130. Costing component 120 can then determine, based on the relief device information, cost options for distributing the processing to the task to relief devices of the cluster. In an aspect, RDIC 130 can be included in a mobile device, e.g., a relief device, burdened device, etc., in a carrier-side component, e.g., a RAN component, a NodeB, etc., in a wireless network component, e.g., a Wi-Fi access point device, a router, a server, etc., or nearly any other component communicatively coupled to costing component 120. Returning to the example of facial recognition processing of 20 faces in a digital image, RDIC 130 can return the relief device information for RD1 and RD2 where those devices are within the cluster. Based on the relief device information, costing component 120 can determine a costing option for distributing the facial recognition task. This cost option, for example, can be that 10 of the faces are processed on the burdened device, 6 on RD2 at a slow enough pace to not exceed the user designated cluster participation cutoffs, and 4 faces on RD1 to minimize the user designated fees that will need to be paid to an account associated with RD1.

This 10-6-4 processing distribution can be faster than processing all 20 devices on the burdened device at an acceptable cost to the user of the burdened device and without imposing substantially on the experience of the users of RD1 and RD2. In some instances, the monetary cost of the 10-6-4 distribution can be less than if all 20 faces were processed on the burdened device, such as where the burdened device is nearing the contractually allotted data limit and would incur a substantial charge for another block of data usage, outsourcing the processing to RD1, even at $0.01/minute of processing can be cheaper given that there is no per-byte fee for data access. It will be noted that given the large number of parameters and options, not all possible scenarios can be reasonable explicitly recited herein but that all such permutations are considered within the scope of the present disclosure.

In an aspect, an exemplary simple model can include the following parameters:

u—utility of a mobile service, a measure of satisfaction perceived by the mobile user, which may be indirectly revealed by the price the user is "willing to pay";

T—time to complete the service without distributed computing cluster resources;

w—cost of waiting per second, which reduces the satisfaction;

p—cellular usage payment to carrier without employing distributed computing cluster resources.

A mobile user can therefore consider a mobile service useful if there is still surplus in the utility after deducting the cost of the waiting time and monetary cellular payment:

$$u - w*T - p > 0 \qquad \text{Eq. 1}$$

When the network is congested, the delay component w*T becomes a significant factor and fewer users would be willing to use the network. As an example, a user may consider the value of watching a 100 MB video of highlights of the latest basketball game to be $5 and the cost of waiting (before continuous streaming starts) to be $0.25 per second. Assuming the wireless service plan to be $25 for 2 GB, the cellular payment would be $1.25. Under this model, the user would not desire to watch the video if the delay is longer than 15 seconds (waiting cost of $3.75).

Continuing the exemplary simple model, where a distributed computing cluster is available, then the user will have the option to distribute the task to multiple mobile devices to reduce the time of completion. Where the user of the burdened device can pay other relief devices for their support:

t—time to completion with relief device participation, typically smaller than T since the tasks are distributed;

m—number of relief devices;

s—incentive payment to each relief device;

q—cellular usage payment from the burdened device to carrier when cluster computing is employed.

A mobile user with the burdened device can consider a mobile service with cluster computing useful if there is surplus in utility after paying the relief devices:

$$u - w*t - m*s - q > 0 \quad \text{Eq. 2}$$

Which can result in monetary cost savings where:

$$w*T + p > w*t + m*s + q \quad \text{Eq. 3}$$

such that the added payment to the relief devices should be lower than the savings achieved through reduced waiting time and reduced payment to the wireless carrier by using cluster computing.

It can be noted that the carrier can be willing to pay a cost to significantly reduce cellular network congestion, e.g., the carrier can pay some or all of 'm*s', some other non-monetary incentive (e.g., increasing data limit of a subscriber package), etc. As such, the relief devices payment cost (q) from the burdened device can be reduced to $0 to the burdened device, where for example, the carrier pays all of 'm*s', as long as:

$$w*T + p > w*t + q \quad \text{Eq. 4}$$

From the perspective of the relief device user, the benefit should outweigh the cost as well. As an example, participation in a cluster should not leave the relief device battery repeatedly drained causing the relief device user to have a negative experience in that his or her device is continually needing to be charged or is being drained down to the point that it is effectively unusable. If b is the battery drain cost and v is the cellular data cost, then the following can hold for a relief device user to be interested in cluster participation:

$$s > b + v \quad \text{Eq. 5}$$

For example, use of the "personal hotspot" application on iPhone 4 devices to support a WiFi-only iPad device can consume roughly 200 MB of data during one hour of usage. In this case, v would be $2.50 on a 2 GB/$25 monthly plan. The battery on the iPhone 4 can drop by 22% for one hour of usage serving as hotspot. Thus, if the relief device user considers every 10% of battery drain to be worth $1, then b would be $2.20. Therefore, the incentive payment s to the relief device should be higher than $4.70 if the task consumes the same amount of cellular data and battery usage. As another example, considerate of more 'costs', where:

b—battery cost;
c—computation cost (perceived value of CPU usage and memory usage);
u—cost of storage;
v—bandwidth cost;
then, $$s > b + c + u + v \quad \text{Eq. 6}$$

This illustrates that nearly any other cost valuation can be employed in determining cost options.

In an aspect, the disclosure presented herein is not limited to the explicitly disclosed formulas, equations, or algorithms presented herein, e.g., Eq.1-6, etc. The disclosed subject matter includes permutations or extrapolations of these explicitly disclosed formulas, equations, or algorithms. As an example, Eq. 2 can be extrapolated to include:

$$u - (w*t) - \Sigma_{i=1}^{N}(s_i) - q > 0 \quad \text{Eq. 2a}$$

where 'i' is an integer indexing through a count of available relief devices participating in a distributed computing cluster, 'N' represents the total count of relief devices 'm'. and $s_i$ is the incentive payment associated with relief device i. As such, Eq. 2a can represent a situation where the cost of relief from a relief device can be different for each relief device in a set of relief devices.

In another aspect, the incentives can be paid by the burdened device user or the carrier. In an embodiment, the carrier can serve as the clearinghouse that handles all the transactions (or micro payments) on behalf of the owners of the mobile device participating in distributed computing cluster.

In a further aspect, a cluster can allow for parallel use of cellular bandwidth with sharing of information among cluster devices with non-cellular radios. As an example, two devices can each download half of a 100 MB film over a cellular connection and then share their half, e.g., 50 MB, with the other device over Wi-Fi. This can result in each device's having the full 100 MB movie. Moreover, the cellular provider experiences roughly half the cellular radio total usage, e.g., 100 MB rather than 200 MB (100 MB for each device). Furthermore, the devices receive the movie in roughly half the time it would have taken each to download the entire movie themselves. It will be noted that this process shifts data transfer from the cellular service to a non-cellular radio, e.g., Wi-Fi, Bluetooth, etc. Thus, where devices of the cluster are local to each other, this process can be more efficient than where they are not local to each other, e.g., Wi-Fi over a local network is typically much faster than routing traffic though a broadband provider (uploading speeds are typically much lower than intranet speeds). In some embodiments, this parallelism can be included in RDIC 130 information, e.g., access to the same files by multiple devices of a cluster can be noted and the cost of accessing an already downloaded copy of a file can be very low. As an example, where students in a college class all download the daily class notes as they arrive to class, a cluster of devices in the classroom can indicate that copies of the class notes have already been downloaded and can be shared at low cost with other cluster members without needing to download another copy.

As a more detailed non-limiting example, a conference volunteer may decide to use a cluster to quickly recognize all faces in the room at a conference since her own device may not have sufficient computation power and communication bandwidth to do this task in real time. Assuming that there are 1000 attendees in the conference and a centralized database of all their faces is stored in a back-end cloud device, if the burdened device solely relies on the back-end cloud, the cloud allows a user to upload a small image of a face and it returns the name of the conference attendee. Also, assume that there are typically 50 attendees in each session and 10 of them have devices available to participate in a cluster. If the volunteer with the burdened device does the task without the cluster, the burdened device may detect the number of faces in the snapshot and crop a small image for each face, submit each face separately for recognition, and return the list of attendees to the user. Where, for example, detecting a face takes 10 seconds, submitting a face takes 5 seconds, and returning entries to a list takes 2 seconds, this would use 10+5*50+2=262 seconds (e.g., T) without the cluster. However, by using the cluster with 10 relief devices, e.g., each performing 5-face recognition tasks, the time can be reduced significantly, since submitting the face can be distributed to 10 cluster devices. Assume that the overhead of communicating with all relief devices is 2 seconds (e.g., through multicast), then the cluster total time (e.g., t) can be 10+2+5*5+2=39 seconds.

Continuing the example, the surplus utility of the burdened device without cluster can be the utility of real-time face recognition (e.g., u) of 50 users in a conference session. This can be set as $10 to the conference organizers, and it can cost $0.03 in cellular payment for any phone to submit a face recognition request to the cloud, and $0.02 can be the cost of delay per second (e.g., w). Then w*T would be $0.02*262=$5.24 and p would be $0.03*50=$1.50. So the surplus in utility (see Eq. 1) after subtracting the waiting cost and cellular payment would be $10−$5.24−$1.50=$3.26.

Further in this example, assume that the cost equivalent to the battery drainage b for performing the subtask on each relief device is $0.10 per relief device. The cellular payment can be $0.03*5=$0.15 each. The burdened device user can decide to pay $0.3 (>$0.25) to each relief device to cover their actual costs. So the surplus utility for the burdened device (see Eq. 2) is $10−$0.02*39 −10*$0.3−0=$6.22 (and there would be no cellular payment on the burdened device because the tasks have been distributed). The use of a distributed computing cluster can result in a saving of $2.96.

In this example, if it is further assumed that each relief device is powerful enough to perform face recognition on its own, then all the cellular payments can be removed; however, b would become higher because each relief device would work harder to finish its subtask without contacting the cloud. It can be noted for this example, that the face recognition application on each relief device can simply employ a face classification model, which can be much smaller than training data, to perform facial recognition tasks.

Figure 2:
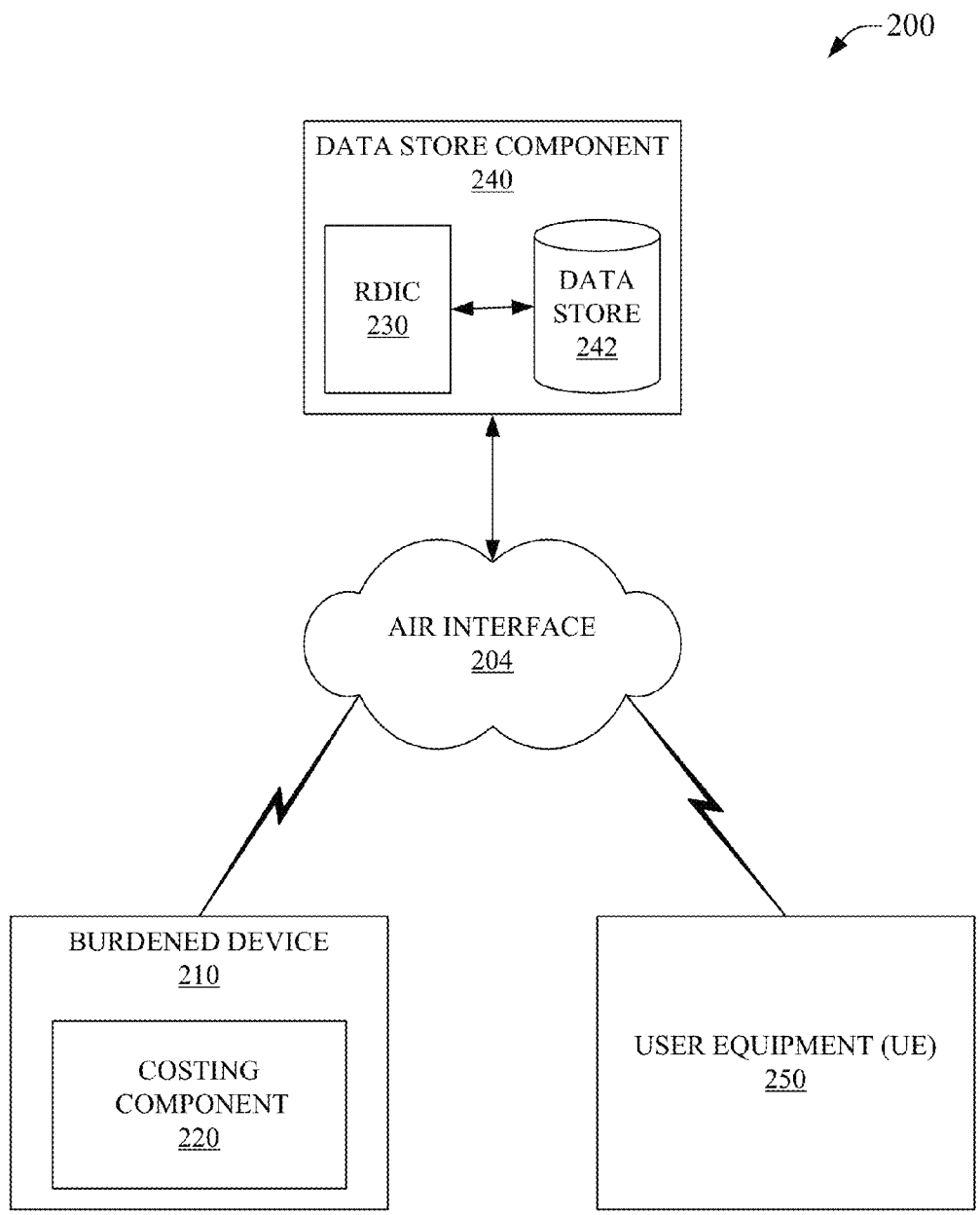
FIG. 2 is a depiction of a system that facilitates task costing with relief device information in accordance with aspects of the subject disclosure.

FIG. 2 is a depiction of a system 200 that can facilitate task costing with relief device information in accordance with aspects of the subject disclosure. System 200 can include air interface 204. Air interface 204 can be a radio-based communications link between a mobile device and a base station. As such, air interface 204 can include a wireless link between a mobile device and a radio access network (RAN), e.g., a cellular type interface. In some embodiments, air interface 204 can include a wireless link between a user equipment and local area network (LAN) or a wide area network (WAN), e.g., an IEEE 802.11xx type interface. In other embodiments, air interface 204 can include a wireless link between a first user equipment and a second user equipment, e.g., a Bluetooth interface, a Zigbee interface, etc. It will be noted that other air interfaces can be employed and that these are considered within the scope of the subject application despite not being explicitly recited for the sake of clarity and brevity.

System 200 can further include burdened device 210 that can include costing component 220. Burdened device 210 can be a mobile device with a pending task. Costing component 220 can determine the cost of performing the task on burdened device 210 or on a cluster comprising user equipment (UE) 250.

System 200 can further include data store component 240 that can include RDIC 230 communicatively coupled to data store 242. As such, UE 250 can facilitate access to relief device information that can be stored on data store 242. In an aspect, this can be accomplished by way of RDIC 230 through air interface 204. As an example, where air interface 204 links UE 250 to data store component 240 by way of a RAN (not illustrated), RDIC 230 can store relief device information related to UE 250 on data store 242.

RDIC 230 can also facilitate access to relief device information stored on data store 242. As such, burdened device 210 can receive relief device information from data store 242 by way of RDIC 230 and air interface 204. Costing component 220 can then determine cost options related to the received relief device information. As illustrated, UE 250 can store relief device information at data store component 240 and costing component 220 can employ this information, received by way of RDIC 230, to determine costing options as disclosed herein. In some embodiments, data store component 240 can be part of a NodeB or other wireless provider equipment. In other embodiments, data store 240 can be included in a third-party component, such as that of a service provider contracted to facilitate access to relief device information, a cloud service, a remote server, a distributed storage system, etc.

Figure 3:
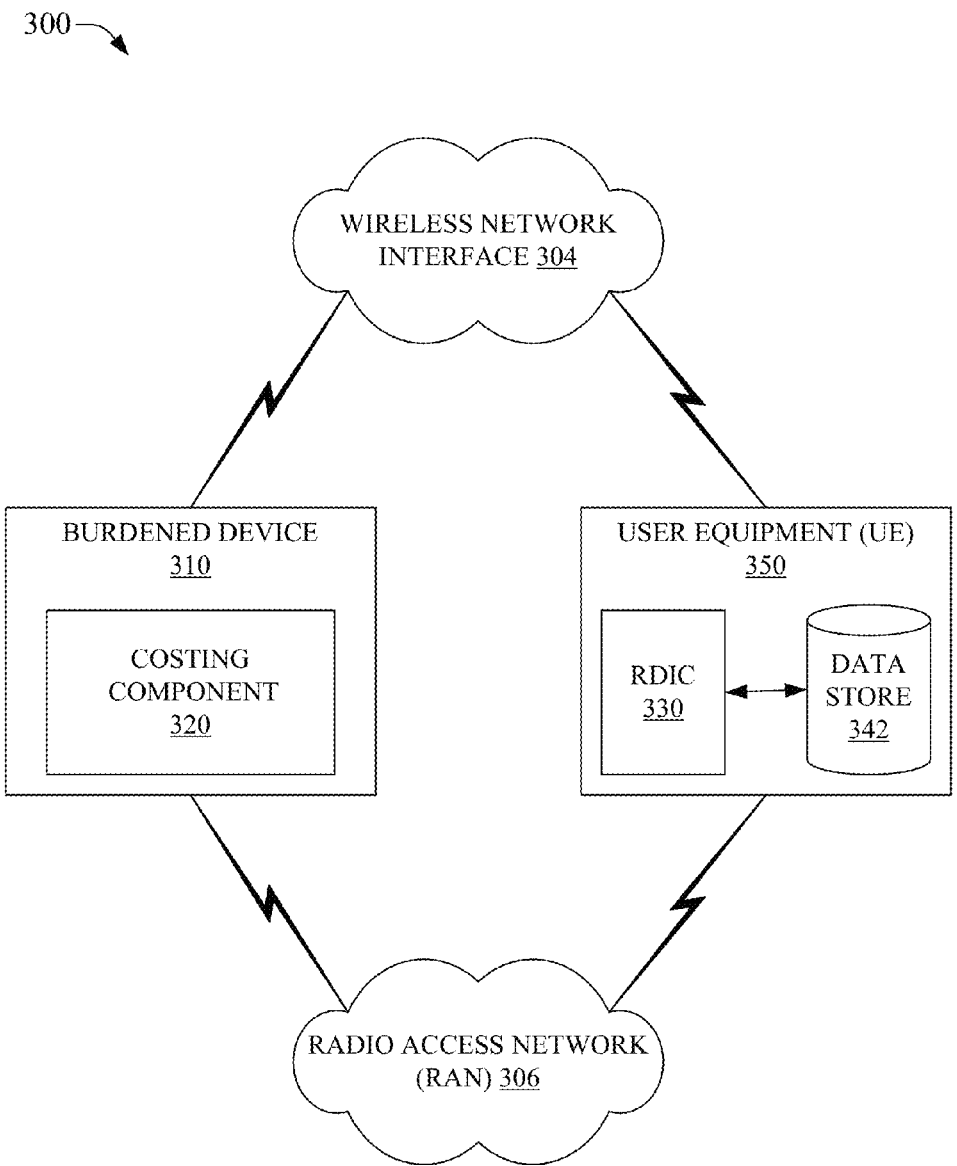
FIG. 3 illustrates a system that facilitates task costing with relief device information in accordance with aspects of the subject disclosure.

FIG. 3 illustrates a system 300 that facilitates task costing with relief device information in accordance with aspects of the subject disclosure. System 300 can include burdened device 310 that can include costing component 320. Burdened device 310 can be a mobile device with a pending task. Costing component 320 can determine the cost of performing the task on burdened device 310 or on a cluster comprising user equipment (UE) 350. UE 350 can include RDIC 330 communicatively coupled to data store 342. As such, UE 350 can facilitate access to relief device information that can be stored on data store 342. In an aspect, this can be accomplished by way of RDIC 330.

In an embodiment, system 300 can communicatively couple burdened device 310 with UE 350 by way of wireless network interface 304. Wireless network interface 304 can include Wi-Fi type connections, e.g., IEEE 802.11xx, or other wireless protocols such as Bluetooth or Zigbee. In an aspect, wireless network interface 304 can facilitate direct communication between UE 350 and burdened device 310 through the wireless interface, e.g., through an intranet, etc., or directly, such as by Bluetooth link.

In another embodiment, system 300 can communicatively couple burdened device 310 with UE 350 by way of RAN 306. RAN 306 can be part of a wireless carrier infrastructure. In an aspect, RAN 306 can facilitate direct communication between UE 350 and burdened device 310 through a cellular network or other service provided by a wireless carrier (e.g., texting, short messaging service, etc.)

RDIC 330 can also facilitate access to relief device information stored on data store 342. As such, burdened device 310 can receive relief device information from data store 342 by way of RDIC 330 and an interface, e.g., 304 or 306. Costing component 320 can then determine cost options related to the received relief device information. As illustrated, UE 350 can store relief device information at data store component 342 and costing component 320 can employ this information, received by way of RDIC 330, to determine costing options as disclosed herein.

Figure 4:
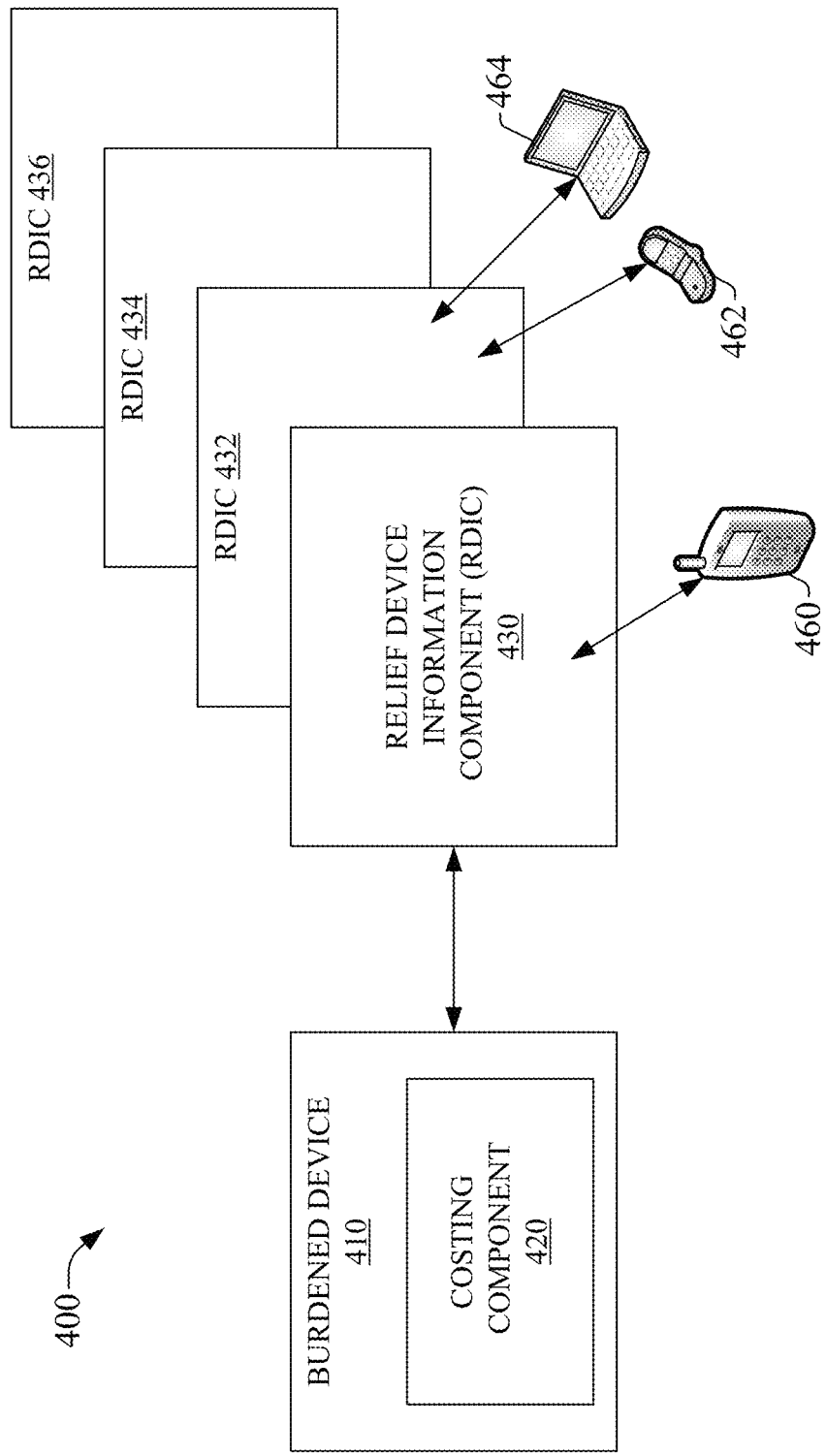
FIG. 4 illustrates a system that facilitates task costing for a plurality of asset catalogs in accordance with aspects of the subject disclosure.

FIG. 4 illustrates a system 400 that facilitates task costing for a plurality of asset catalogs in accordance with aspects of the subject disclosure. System 400 can include burdened device 410 that can include costing component 420. Burdened device 410 can be a mobile device with a pending task. Costing component 420 can determine the cost of performing the task on burdened device 410 or on a cluster comprising a UE (not illustrated).

In an aspect, a cluster can comprise a plurality of UEs. In a further aspect, a UE of the cluster can be associated with a RDIC, e.g., 430-436. Where system 400 includes a plurality of RDICs, e.g., 430-436, it will be appreciated that burdened device 410 can receive relief device information for a plurality of UEs comprising a cluster. It will be noted that a RDIC, e.g., 430-436 can be associated with one or more UEs. As an example, RDIC 430 can be associated with one UE, e.g., smartphone 460. As a further example, RDIC 432 can be associated with a plurality of UEs, e.g., cell phone 462 and mobile computer 464, etc. Regardless of the number of UEs associated with an RDIC, e.g., 430-436, the RDIC, e.g., 430-436, can facilitate access to relief device information, as disclosed herein, for the UEs associated with it.

It will be noted that system 400 can include fewer or more RDICs, e.g., 430-436 than illustrated and, wherein each RDIC can be associated with one or more UEs, system 400 can include any number of UEs in a distributed computing cluster. As such, costing component 420 can determine one or more costing options associated with the relief device information received by way of the RDIC, e.g., 430-436. Where there are numerous UEs with detailed relief device information, there can be a large number of costing options. As such, costing component 420 can further employ rules to rank the costing options. As an example, costing component 420 can rank the top three costing options to include the fastest processing time, the cheapest monetary cost for task completion within a predetermined period, and the fastest processing time within a predetermined monetary cost. As another example, costing component 420 can rank the top three costing options to include the top three fastest task completion cost options and display their associated monetary cost, e.g., allowing a user to select a task time by monetary cost ranking.

Figure 5:
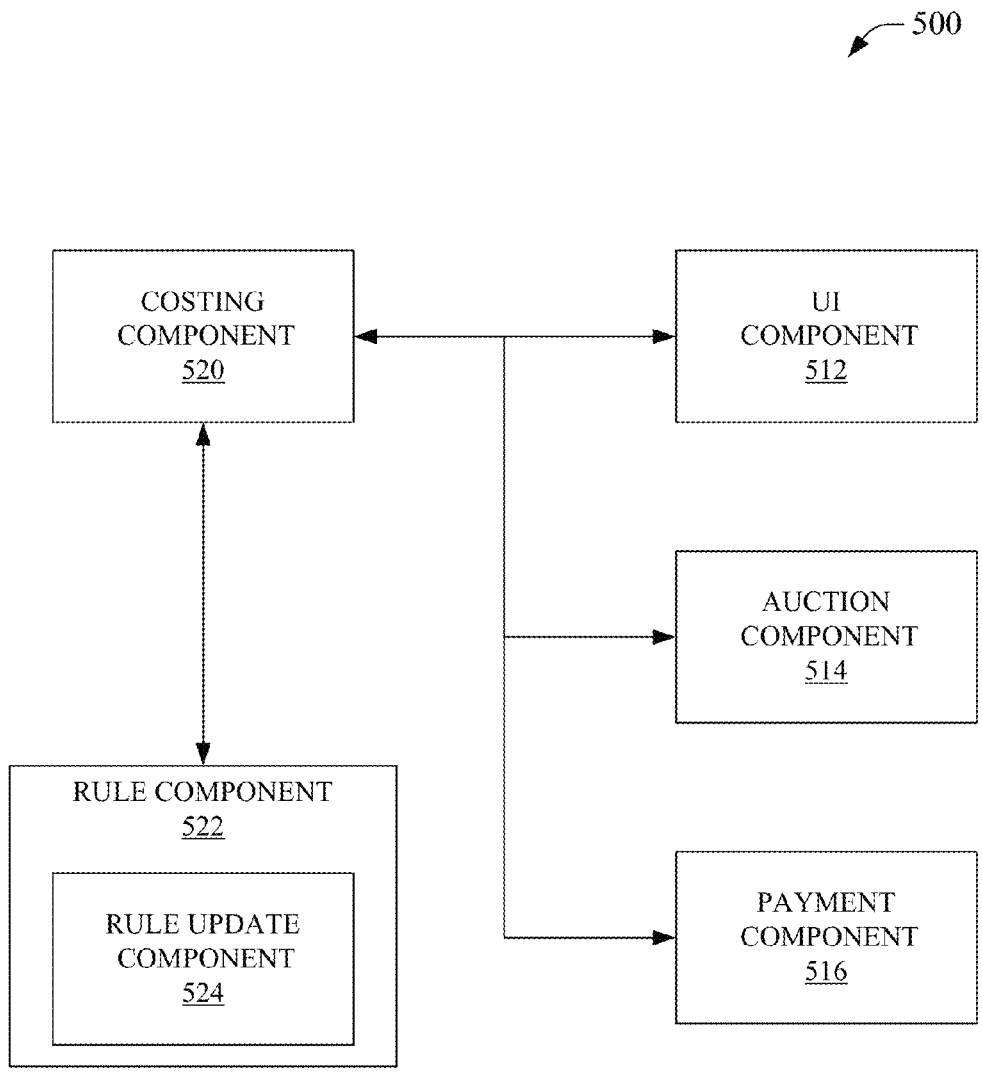
FIG. 5 illustrates a system that facilitates task costing and satisfaction mechanisms in accordance with aspects of the subject disclosure.

FIG. 5 illustrates a system 500 that facilitates task costing and satisfaction mechanisms in accordance with aspects of the subject disclosure. System 500 can include costing component 520. Costing component 520 can determine the cost of performing a task on a burdened device without employing distributed computing techniques. Costing component can further determine costing options associated with the cost of distributing sub-tasks to relief devices participating in a distributed computing cluster.

Costing component 520 can be coupled to rule component 522. Rule component 522 can facilitate access to a predetermined rule relating to determined cost options. As an example, a rule can relate to ranking or ordering determined cost options. As another example, a rule can relate to classification of determined cost options, e.g., placing cost options with a particular balance of costs (monetary, speed, privacy, likelihood of failure, etc.) into different classes, such as favorable, unfavorable, etc. In an embodiment, rule component 522 can facilitate access to a rule relating to determining a cost option. As an example, a rule can relate to computing a cost option, e.g., a formula can be applied as a rule or algorithm. As another example, a rule can relate to rejecting cost options prior to completing the determination of the cost option, e.g., discarding a cost option prior to completion where a cost is not acceptable, such as the time costs exceeding a predetermined limit, the number of relief devices exceeding a predetermined number, etc. Furthermore, rule component 522 can include rule update component 524. Rule update component 524 can enable a rule to be updated, deleted, created, or otherwise modified. This can include forming sets of rules, wherein a rule can be applied or withheld from application from being part of a particular set of rules.

System 500 can further include user interface (UI) component 512. UI component 512 can facilitate presenting cost options to a user by way of a user interface of a device. As an example, a set of three cost options can be presented to a user on a display to facilitate user selection of a cost option.

Moreover, system 500 can include auction component 514. Auction component 514 can facilitate access to cost options to facilitate auctioning of the task. As an example, a current average cost option can be employed by auction component 514 to set an opening bid for an automated auction between relief devices and a burdened device to route the task to the lowest cost providers. In an aspect, this can include eliminating non-compliant relief devices from an auction, e.g., those that will bid low but do not meet minimum criteria, such as a low bidder with a very high failure rate, etc.

System 500 can further include payment component 516. Payment component 516 can facilitate satisfaction of payments to accounts associated with relief devices selected for task completion. In an aspect, payment component 516 can interact with a wireless network provider or carrier to facilitate a micropayment system. As an example, AT&T can act as a micropayment system partner that receives payment information by way of payment component 516 to satisfy costs associated with allocating tasks to relief devices in a cluster.

Figure 6:
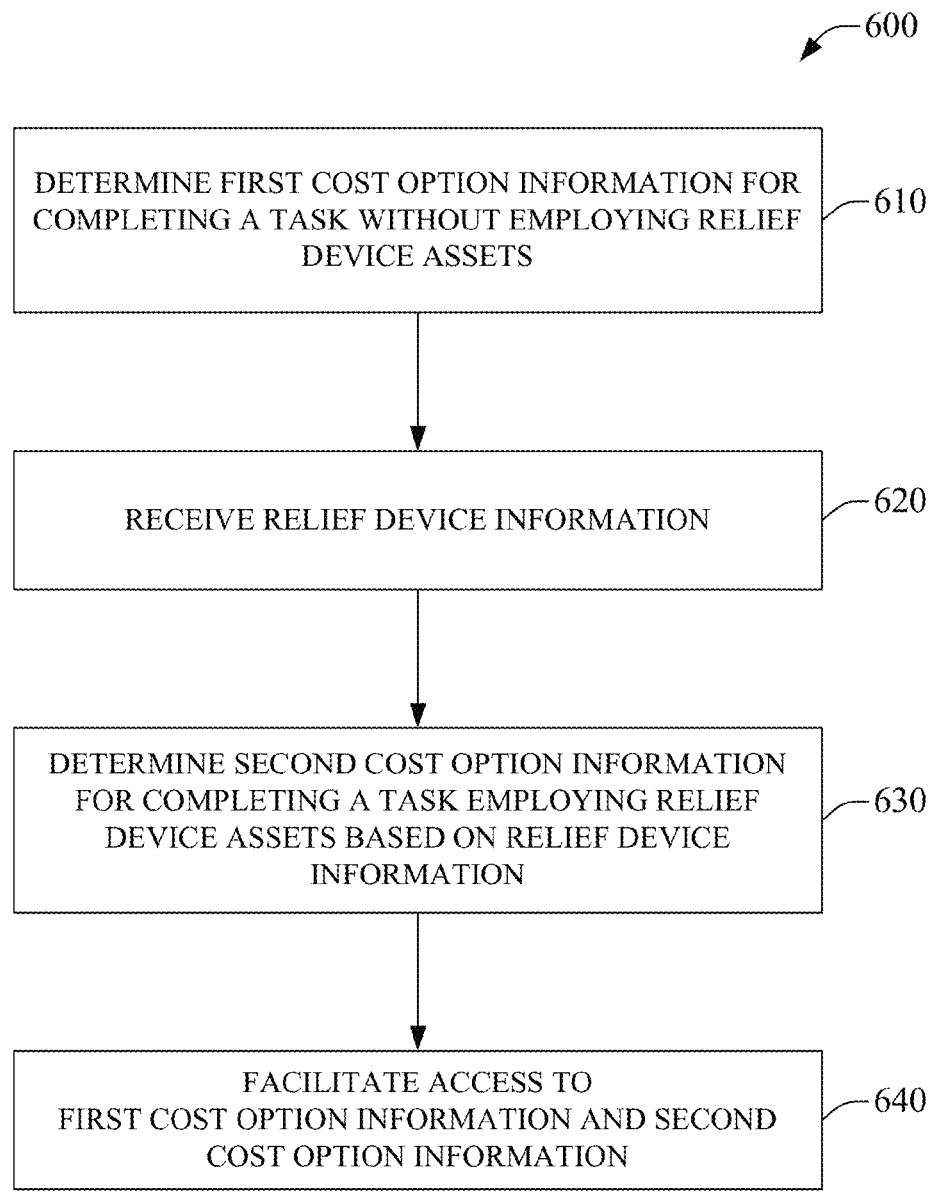
FIG. 6 illustrates a method for facilitating task costing in accordance with aspects of the subject disclosure.
Figure 7:
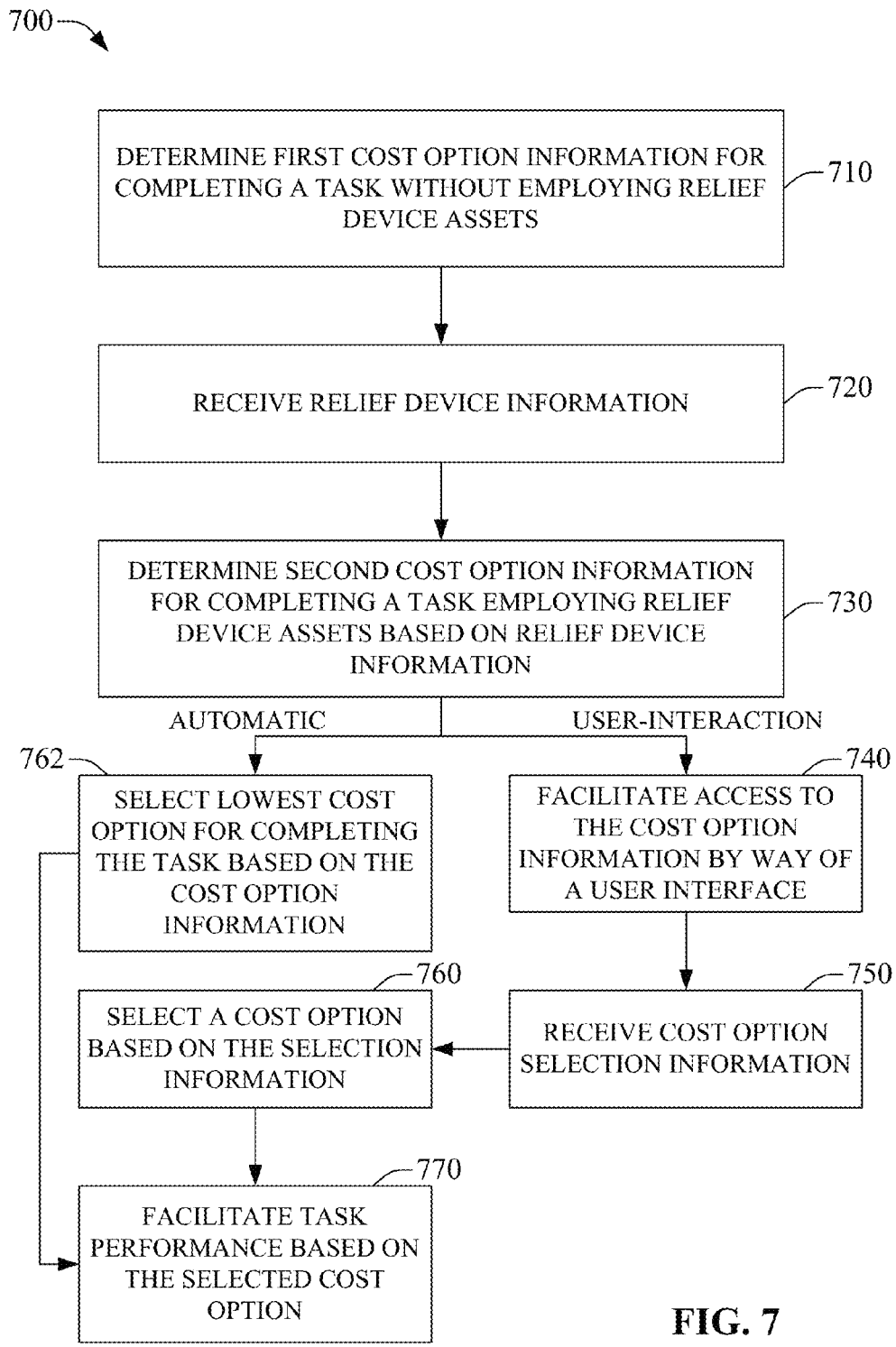
FIG. 7 illustrates a method for facilitating task costing and satisfaction mechanisms in accordance with aspects of the subject disclosure.
Figure 8:
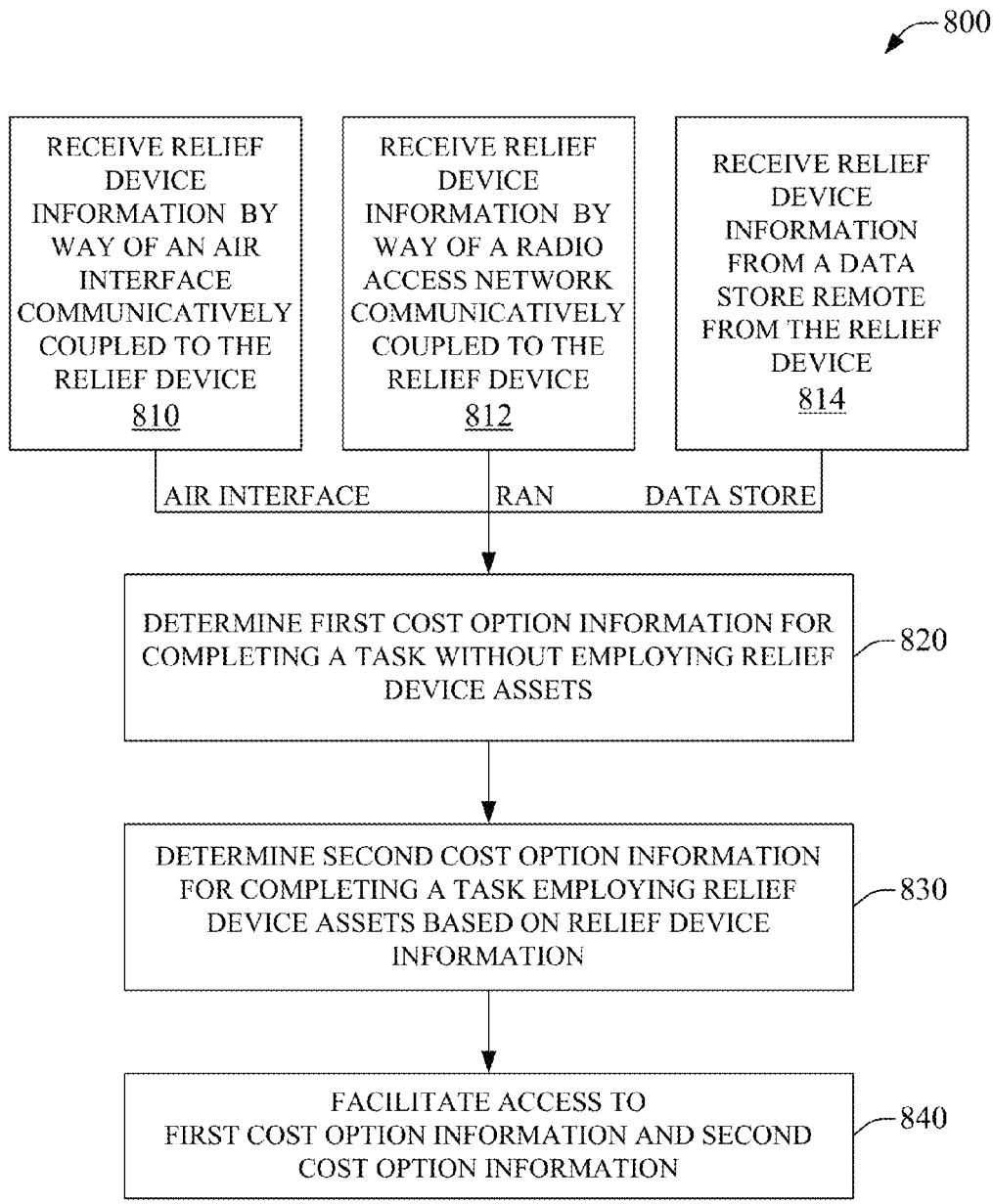
FIG. 8 illustrates a method for facilitating task costing and relief device information access mechanisms in accordance with aspects of the subject disclosure.

In view of the example system(s) described above, example method(s) that can be implemented in accordance with the disclosed subject matter can be better appreciated with reference to flowcharts in FIG. 6-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 6 illustrates aspects of method 600 facilitating task costing in accordance with aspects of the subject disclosure. At 610, method 600 can include determining first cost option information for completing a task without employing relief device assets. The cost analysis can be determined based on the expected time, battery drain, processing cycle consumption, bandwidth consumption, or other factor(s) related to the performance of a burdened device. The first cost option information can be a benchmark number employed in comparison to other cost option information, such as that related to parsing out subtasks to relief devices, so as to select a task processing scheme that reflects a predetermined optimization of resources, for example, lowest cost, fastest time, least consumption of resources, etc. The first cost option information can also be employed to determine if distributed computing should be sought. Where this first cost analysis indicates that performing the task on a burdened device itself does not satisfy conditions that would indicate that distributed computing is desirable, the task can simply be processed by the burdened device rather than proceeding to 620. However, where the cost analysis determines cost option information sufficiently satisfies a condition relating to distributing subtasks to a mobile computing cluster, method 600 can proceed to 620.

At 620, relief device information can be received. Relief device information can include information about other cluster device hardware and software, e.g., processor speed, battery/charging information, available memory, radio technology (e.g., 2G, 3G, 4G, IEEE 802.11a/b/g/n, Bluetooth, Zigbee, etc.), operating system and version, background processes, etc. Further, relief device information can include other cluster device user preferences, such as, willingness to participate in a cluster, usage history, performance history, etc. Additionally, relief device information can include other cluster device user environments, such as service agreement information pertaining to cost for data access on cellular resources (e.g., 2 GB/month included plus $25/GB thereafter), Wi-Fi access agreements for the user device, etc.

At 630, second cost option information can be determined for task completion employing relief device assets. This second cost option information can be based on the relief device information received at 620. Second cost option information can reflect costing of distributed task completion in a mobile distributed processing cluster. As disclosed herein, see Eq. 1-6 and elsewhere, distribution of task completion, e.g., distributing subtasks, can affect the cost of completing a task. In an aspect, distribution can allow for parallel completion of task aspects such as processing, downloading, uploading, etc. Further, distribution can allow for allocation of task aspects to devices that can be better poised to take on the task, such as moving computationally intensive processes to an idle-state device in the cluster that has a powerful processor, moving downloading of data to a cluster device that has excess unused bandwidth available, etc.

At 640, access to the first cost option information and the second cost option information can be facilitated. At this point, method 600 can end. In an aspect, access to this information can be by a costing component to facilitate determining which cost option to select. In an embodiment, the costing component can facilitate presenting the information by way of a user interface to seek input from a burdened device user in real-time on which cost option is preferable. Access to the cost option information can further facilitate processing related to the cost option information, such as ranking or ordering cost options, classification of cost options, truncated determination of cost option information, etc.

FIG. 7 illustrates a method 700 that facilitates task costing and satisfaction mechanisms in accordance with aspects of the subject disclosure. At 710, first cost option information can be determined for completing a task without relief device assets. The cost analysis can be determined based on parameters related to the performance of a burdened device. The first cost option information can be a benchmark number employed in comparison to other cost option information and can be employed to determine if distributed computing should be sought.

At 720, relief device information can be received. Relief device information can include information about other cluster device hardware and software, operating system and version, background processes, etc. Further, relief device information can include other cluster device user preferences. Additionally, relief device information can include other cluster device user environment.

At 730, second cost option information can be determined for task completion employing relief device assets. This second cost option information can be based on the relief device information received at 720. Second cost option information can reflect costing of distributed task completion in a mobile distributed processing cluster.

At 740, access to the first cost option information and the second cost option information can be facilitated by way of a user interface. The user interface can include a display, a touch sensitive display, etc. Presentation of cost option information can facilitate a user selecting a preferred cost option for resolving a task. As an example, where cost option information includes the three fastest options to complete the task, each with a relative price information, these prices and the time information can be displayed on a user's smartphone display and correspond to soft-keys on the smartphone. The user can select an option by triggering the corresponding softkey. At 750, cost option selection information can be received. In an aspect, this can related to user selection of a cost option presented to the user by way of the UI. At 760, based on the selection information, a cost option can be selected.

At 762, a lowest cost option for completing the task can be automatically selected without presentation of the cost option information through the UI. The lowest cost option selection can be based on the cost option information determined at 730 and 710. In an embodiment, automatic selection can be based on other parameters, not illustrated, such as fastest time to complete the task, lowest monetary cost while performing the task in a time window, e.g., selecting the lowest cost option that completes the task faster than a predetermined time, etc.

At 770, facilitating performance of the task is based on the selected cost option. The selected cost option can be by user selection, e.g., by way of 740, 750, and 760, or can be automatically selected, e.g., by way of 762. At this point, method 700 can end.

FIG. 8 illustrates a method 800 that facilitates task costing and relief device information access mechanisms in accordance with aspects of the subject disclosure. At 810, relief device information can be received over an air interface. The relief device information can be sourced by a relief device communicatively coupled to the air interface. In an embodiment, a first user equipment can provide relief device information to a second user equipment by way of an air interface that can include, for example, a Bluetooth connection between the first and second user equipment, a Wi-Fi connection on a local area network between the first and second user equipment, a Zigbee connection between the first and second user equipment, an infrared link connection between the first and second user equipment, etc.

At 812, relief device information can be received by way of a radio access network (RAN). The relief device information can be sourced by a relief device communicatively coupled to the RAN by an air interface. In an embodiment, a first user equipment can provide relief device information to a second user equipment by way of an air interface from the first UR to a RAN and between the RAN and the second UE over an air interface. In this embodiment, the air interface can be the same or different, for example, the air interface can be a cellular interface. As a second example, the air interface with the first UE can be a cellular interface and the air interface with the second UE can be a Wi-Fi interface. It will be noted that the RAN can interface with the UEs with nearly any air interface and all such interfaces are considered within the scope of the disclosed subject matter.

At 814, relief device information can be received by way of a data store remoter from the relief device. The relief device information can be sourced by a relief device communicatively coupled to the remote data store. In an embodiment, the data store can be located with a wireless service provider equipment such as a NodeB, wireless gateway, etc. In another embodiment, the data store can be located in a facility, such as a conference center, school, etc., such that relief device information can be readily stored thereon and made available to burdened devices at the facility. As an example, a conference center can install a Wi-Fi access point device that includes a data store, such that the data store can store relief device information in the expectation that distributed computing clusters with mobile devices can form often, such as during conference activity at the conference center. The exemplary data store can then be employed to provide the stored relief device information to burdened devices to facilitate formation of the cluster. In a further embodiment, a data store can be located more remotely, such as in a cloud computing center, etc. It will be noted that the data store can be placed nearly anywhere without departing from the scope of the presently disclosed subject matter.

At 820, method 800 can include determining first cost option information for completing a task without employing relief device assets. The cost analysis can be determined based on performance factors for a burdened device. The first cost option information can be a benchmark number employed in comparison to other cost option information. The first cost option information can also be employed to determine if distributed computing should be sought. Where this first cost analysis indicates that performing the task on a burdened device itself does not satisfy conditions that would indicate that distributed computing is desirable, the task can simply be processed by the burdened device rather than proceeding to 830. However, where the cost analysis determines cost option information sufficiently satisfies a condition relating to distributing subtasks to a mobile computing cluster, method 800 can proceed to 830.

At 830, second cost option information can be determined for task completion employing relief device assets. This second cost option information can be based on the relief device information received at 810, 812, or 814. Second cost option information can reflect costing of distributed task completion in a mobile distributed processing cluster. As disclosed herein, see Eq. 1-6 and elsewhere, distribution of task completion, e.g., distributing subtasks, can affect the cost of completing a task. In an aspect, distribution can allow for parallel completion of task aspects such as processing, downloading, uploading, etc. Further, distribution can allow for allocation of task aspects to devices that can be better poised to take on the task, such as moving computationally intensive processes to an idle-state device in the cluster that has a powerful processor, moving downloading of data to a cluster device that has excess unused bandwidth available, etc.

At 840, access to the first cost option information and the second cost option information can be facilitated. At this point, method 800 can end. In an aspect, access to this information can be by a costing component to facilitate determining which cost option to select. In an embodiment, the costing component can facilitate presenting the information by way of a user interface to seek input from a burdened device user in real-time on which cost option is preferable. Access to the cost option information can further facilitate processing related to the cost option information, such as ranking or ordering cost options, classification of cost options, truncated determination of cost option information, etc.

Figure 9:
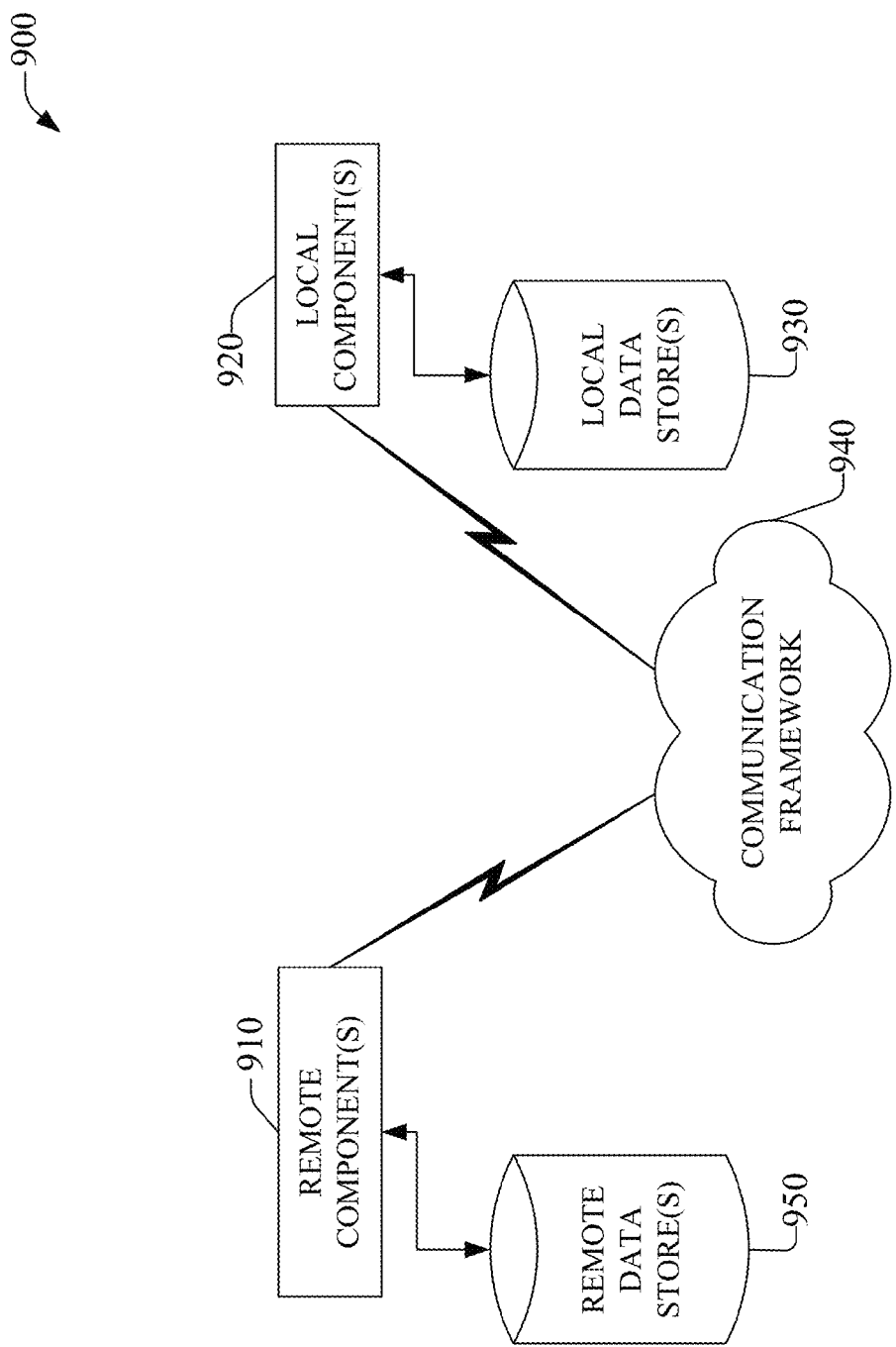
FIG. 9 depicts a schematic block diagram of a computing environment with which the disclosed subject matter can interact.

FIG. 9 is a schematic block diagram of a computing environment 900 with which the disclosed subject matter can interact. The system 900 includes one or more remote component(s) 910, which can include client-side component(s). The remote component(s) 910 can be hardware and/or software (e.g., threads, processes, computing devices). In some embodiments, remote component(s) 910 can include burdened device 110-410, etc., costing component 120-520, etc. As an example, remote component(s) 910 can be a mobile phone comprising a costing component and available for distributed computing in a cluster.

The system 900 also includes one or more local component(s) 920, which can include server-side component(s). The local component(s) 920 can be hardware and/or software (e.g., threads, processes, computing devices). In some embodiments, local component(s) 920 can include relief device information component 130, 230, 430-436, etc., data store component 240, etc. As an example, local component(s) 920 can be a mobile device available to participate in a cluster as a relief device for a burdened device.

One possible communication between a remote component(s) 910 and a local component(s) 920 can be in the form of a data packet adapted to be transmitted between two or more computer processes. As an example, relief device information can be communicated to a burdened device, e.g., remote component 910, over an air interface from a relief device, e.g., a local component 920. The system 900 includes a communication framework 940 that can be employed to facilitate communications between the remote component(s) 910 and the local component(s) 920, and can include an air interface, e.g., air interface 204. The remote component(s) 910 are operably connected to one or more remote data store(s) 950 that can be employed to store information on the remote component(s) 910 side of communication framework 940. Similarly, the local component(s) 920 are operably connected to one or more local data store(s) 930 that can be employed to store information on the to the local component(s) 920 side of communication framework 940.

Figure 10:
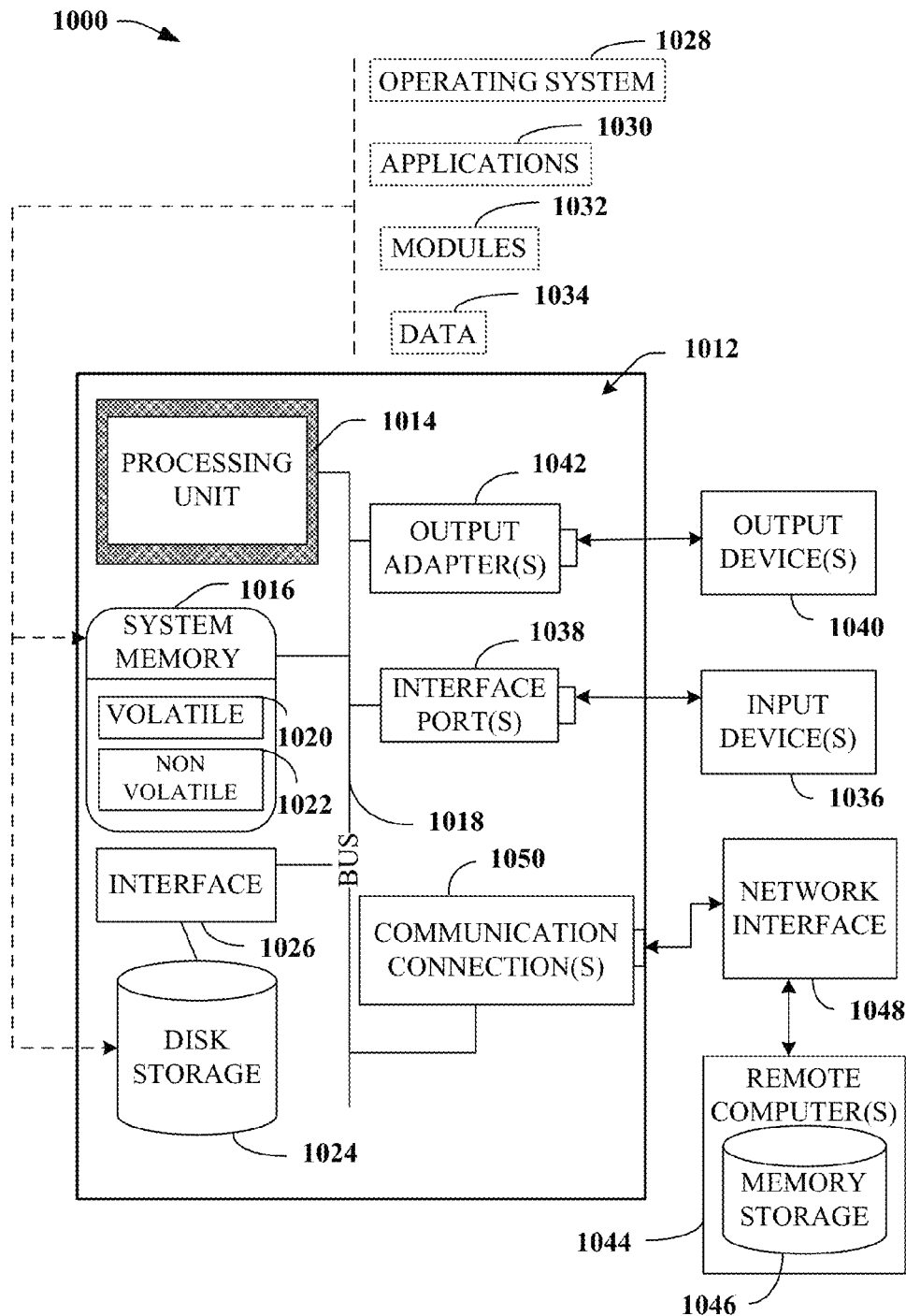
FIG. 10 illustrates a block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1020 (see below), non-volatile memory 1022 (see below), disk storage 1024 (see below), and memory storage 1046 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, part of the hardware of a relief device information component (e.g., 130, 230, 330, 430-436, etc.), burdened device (e.g., 110, 210, 310, 410, etc.), UE (e.g., UE 250, 350, etc.), rule component 522, costing component 120-520, etc., a RAN component (e.g., a component of 306, etc.), data tore component 240, etc., includes a processing unit 1014, a system memory 1016, and a system bus 1018. System bus 1018 couples system components including, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1194), and Small Computer Systems Interface (SCSI).

System memory 1016 can include volatile memory 1020 and nonvolatile memory 1022. A basic input/output system (BIOS), containing routines to transfer information between elements within computer 1012, such as during start-up, can be stored in nonvolatile memory 1022. By way of illustration, and not limitation, nonvolatile memory 1022 can include ROM, PROM, EPROM, EEPROM, or flash memory. Volatile memory 1020 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 can also include removable/non-removable, volatile/non-volatile computer storage media. FIG. 10 illustrates, for example, disk storage 1024. Disk storage 1024 includes, but is not limited to, devices like a magnetic disk drive, floppy disk drive, tape drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to system bus 1018, a removable or non-removable interface is typically used, such as interface 1026.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software includes an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. As an example, user interface 512 can be embodied in a touch sensitive display panel allowing a user to interact with computer 1012, e.g., where computer 1012 comprises costing component 520. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 include, for example, a serial port, a parallel port, a game port, a universal serial bus (USB), an infrared port, a Bluetooth port, an IP port, or a logical port associated with a wireless service, etc. Output device(s) 1040 use some of the same type of ports as input device(s) 1036.

Thus, for example, a USB port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 include, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, cloud service, a workstation, a microprocessor based appliance, a peer device, or other common network node and the like, and typically includes many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "Node B," "evolved Node B (eNode B)," "home Node B (HNB)," "home access point (HAP)," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio access network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
   a memory that stores executable instructions; and
   a processor, coupled to the memory, that facilitates execution of the executable instructions to perform operations, the operations comprising:
   receiving first information related to a first device operable to assist accomplishing a subtask of a task, wherein the task is to be accomplished by way of one or more networked mobile devices;
   determining, for a second device, a base utility value, wherein the base utility value is associated with accomplishing the task without assistance from the first device;
   determining a base monetary cost value based on the base utility value, a utility value relating to priority ranking determined for the accomplishing the task, and a selectable utility to monetary cost factor value;
   determining, for the second device, a first utility value based on the first information, the first utility value associated with the accomplishing the subtask with the assistance of the first device;
   determining a first monetary cost value based on the first utility value; and
   facilitating access to the base monetary cost value and the first monetary cost value to facilitate determining selection of devices comprising the one or more networked mobile devices.

2. The system of claim 1, wherein the determining the base monetary cost value is further based on a base time determined to accomplish the task without the assistance of the first device, a utility per unit time value associated with a delay determined for the accomplishing the task, and a resource monetary cost value associated with a single device fee for a use of resources determined for the accomplishing the task.

3. The system of claim 2, wherein the resource monetary cost value includes a monetary cost for accessing information over an air interface, and wherein the air interface is a cellular radio air interface.

4. The system of claim 2, wherein determining the base monetary cost value includes determining a product of the base time, the utility per unit time value, and the selectable utility to monetary cost factor value, then subtracting the product and the monetary cost value from the utility value.

5. The system of claim 1, wherein the determining the first monetary cost value is further based on a cluster time determined for the accomplishing the task with assistance of a set of devices including the first device, the utility value relating to a priority ranking determined for the accomplishing the task, a utility per unit time value associated with a delay determined for the accomplishing the task, via the set of devices, the selectable utility to monetary cost factor value, a set of monetary cost values associated with a use of resources by devices of the set of devices for the accomplishing the task, and a resource cost value associated with use of the set of devices.

6. The system of claim 5, wherein the resource cost value includes a monetary cost value associated with devices incurring a monetary cost for the use of the resources, including cellular radio resources.

7. The system of claim 5, wherein determining the first monetary cost value includes determining a product of the cluster time, the cost per unit time value, and the selectable utility to monetary cost factor value, then determining a summation of monetary cost values of the set of monetary cost values for available devices of the set of devices, and subtracting the product, the summation of monetary cost values, and the resource cost value from the utility value.

8. The system of claim 1, wherein the operations further comprise:
   assigning the subtask of the task to the first device of the plurality of network devices, based on the base monetary cost value being determined to satisfy a condition related to the first monetary cost value.

9. The system of claim 1, wherein the operations further comprise:
   receiving second information related to a third device operable to assist accomplishing the subtask of the task;
   determining a second utility value associated with the accomplishing the task with assistance of the third device, for the second device, based on the second information;
   determining a second monetary cost value based on the second utility value; and
   facilitating access to the second monetary cost value information to facilitate determining selection of devices comprising the one or more networked mobile devices.

10. The system of claim 1, wherein the first device and the second device are mobile devices.

11. A method, comprising:
   receiving, by a system including a processor, first information related to a subset of relief devices of a set of relief devices comprising one or more mobile devices configured to facilitate accomplishing a subtask of a task, wherein the task is accomplished by way of a plurality of devices including the subset of relief devices;
   determining, by the system, a base utility value, the base utility value associated with accomplishing the task without assistance from the subset of relief devices for a burdened device;
   determining, by the system, a first utility value based on the first information, the first utility value associated with the accomplishing the subtask with assistance from the subset of relief devices, for the burdened device;
   determining, by the system, a base monetary cost value based on the base utility value and a first monetary cost value based on the first utility value, a determined utility value relating to a selectable priority level for the accomplishing the task, a recieved utility per unit time value associated with a delay in the accomplishing the task, and a received adjustable utility to monetary cost factor vaue; and
   facilitating, by the system, access to the base monetary cost value and the first monetary cost value.

12. The method of claim 11, wherein the determining the base monetary cost value further comprises determining, by the system, a base time related to the accomplishing the task without the assistance from the subset of relief devices.

13. The method of claim 12, wherein the determining the first resource monetary cost value includes receiving a cellular data cost rate and determining an amount of data to be accessed by way of a cellular radio.

14. The method of claim 12, wherein the determining the base monetary cost value includes subtracting a product of the base time, the utility per unit time value, and the adjustable utility to monetary cost factor value, from the utility value, and subtracting the first monetary cost value from the utility value.

15. The method of claim 11, wherein determining the first monetary cost value further comprises:
   determining, by the system, a cluster time related to the accomplishing the task with the assistance from the subset of relief devices;
   determining, by the system, a set of monetary cost values associated with a use of a resource by devices of the set of relief devices for the accomplishing the task;
   determining, by the system, a set of selected relief devices of the set of relief devices; and
   determining, by the system, a resource cost value associate with uses of the set of relief devices.

16. The method of claim 15, wherein the determining the resource cost value includes determining a monetary cost value associated with a relief device of the subset of relief devices incurring a monetary cost for the use of the resource, the resource including a cellular radio resource.

17. The method of claim 15, wherein the determining the first monetary cost value includes subtracting a product of the cluster time and the cost per unit time value, subtracting the summation of monetary cost values for the set of selected relief devices from the set of monetary cost values, and subtracting the resource cost value, from the utility value.

18. A device, comprising:
   a memory that stores executable instructions; and
   a processor, coupled to the memory, that facilitates execution of the executable instructions to perform operations, comprising:
      receiving relief device information related to a first device for accomplishing a subtask of a task, wherein the task is accomplished by a set of networkable devices including one or more mobile devices;
      determining base monetary cost value information associated with accomplishing the task without assistance from the first device for a second device, wherein the detemining the base monetary cost value information comprises subtracting a product of a base time and a utility per unit time value, multiplying the product by a monetary cost conversion factor value, and subtracting a first monetary cost value from a utility value;
      determining relief monetary cost value information associated with the accomplishing the task with the assistance of the relief device, for the second device, based on the relief device information; and facilitating access to the base cost value information and the relief cost value information.

19. The device of claim 18, wherein the determining the relief cost value information includes subtracting a product of a cluster time and the utility per unit time value, multiplying the product by the monetary cost conversion factor value, subtracting a summation of monetary cost values corresponding to available devices of the set of network devices, and subtracting a resource cost value, from the utility value.

20. The device of claim 19, wherein the operations further comprise:

distributing the subtask of the task to the first device based on the base monetary cost value being determined to satisfy a condition related to the relief monetary cost value information, and wherein the first device is a mobile device.

\* \* \* \* \*